Figure 1:
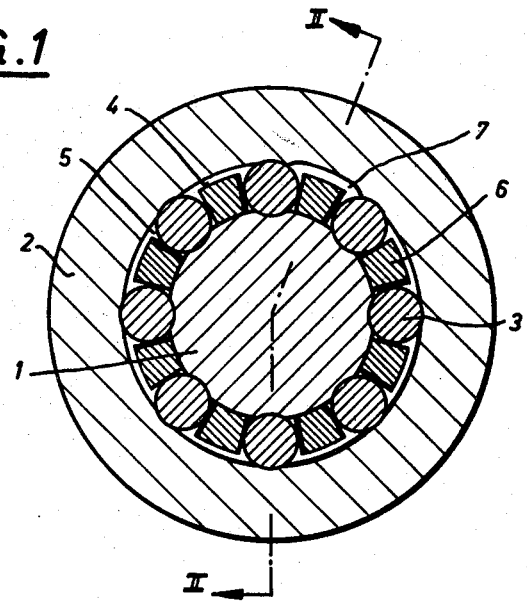

May 11, 1965   C. B. STRANDGREN   3,182,522
ROLLER SCREW

Filed July 9, 1963   3 Sheets-Sheet 1

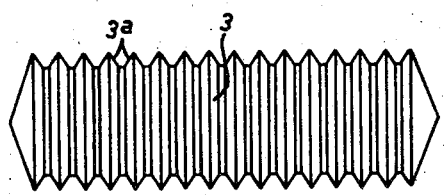
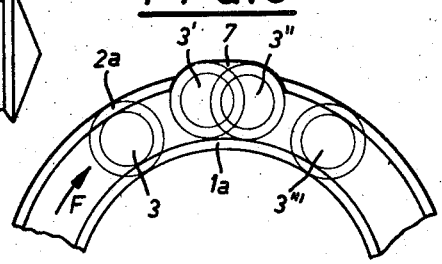
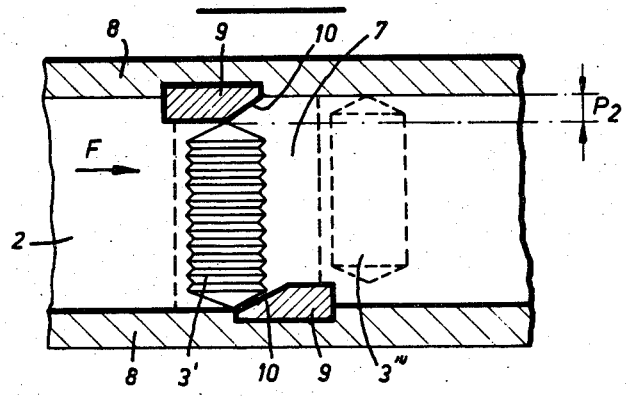
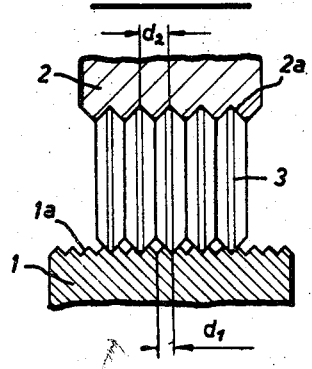
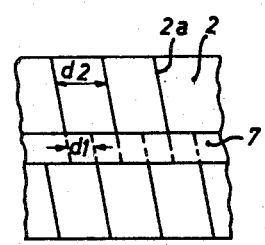

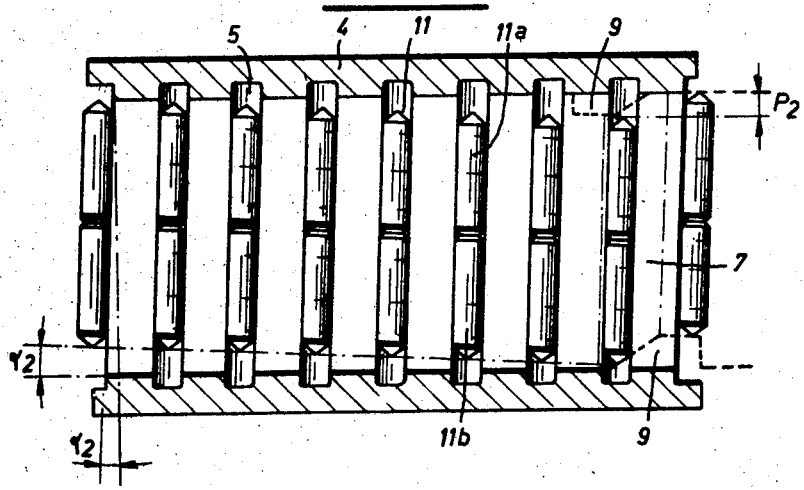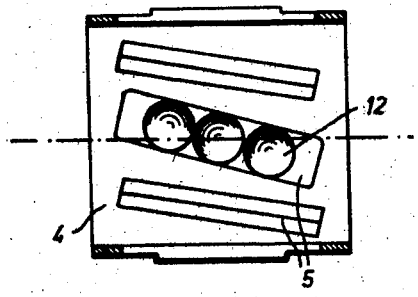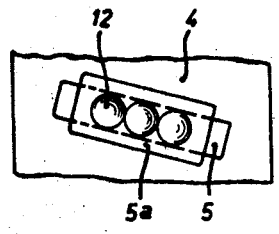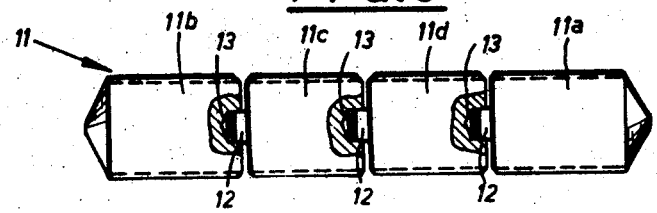

3,182,522
ROLLER SCREW
Carl Bruno Strandgren, 12 Chemin Plaisante,
Lausanne, Switzerland
Filed July 9, 1963, Ser. No. 293,738
Claims priority, application Switzerland, July 14, 1962,
8,506/62
22 Claims. (Cl. 74—459)

This invention relates to a roller screw which consists of a screw and a nut, the threat diameter of the latter being greater than the diameter of the thread of the screw, so that an annular space is formed between screw and nut, and also of rotating bodies disposed in said annular space and engaging both in the thread of the screw and in the thread of the nut. Roller screws of this type are already known and afford the advantage that the friction when a screw is screwed into a nut is considerably reduced and that axial play is eliminated.

When the screw is turned, it travels in the same way as in an ordinary nut, but is supported during this movement by the rotating bodies surrounding it, while the latter are caused to rotate by the screw. Depending on whether the rotating bodies used are balls or rollers provided with grooves or with screwthread, roller screws of this type have the properties of a ball or roller bearing in which, as is well known, the loss of energy through friction is very slight and sliding friction is practically eliminated.

While the rotating bodies roll in the nut and screw threads when the screw is turned, they generally receive an axial thrust in the nut, depending on the corresponding thread pitches, so that at the end of the nut they would pass out or fall out if steps were not taken to prevent that. When balls are used it is known that the balls on reaching one end of the nut are transported through a return passage back to the other end of the nut, where they are again introduced into the gap between the screw and the nut. In this way a periodical return of the balls is achieved.

A disadvantage of these systems consists in that when passing through the return passage the balls must twice change their direction of movement by 90° on each occasion, first when after removal from the screw in the radial direction they are deflected into the direction running parallel to the axis of the screw, and second when after they have performed an axial return movement they are deflected again into the radial direction towards the screw. These deflections give rise to additional frictional losses.

Roller screws working with balls are also known in which the balls in each case perform only one revolution inside the nut before they are moved axially back again. This return movement takes place in an aperture which is open in the direction of the screw, and which extends only over two thread grooves, with the aid of a finger engaging into the screwthread. This finger prevents the balls from moving further axially and pushes them into the aperture where they are moved further by the succeeding balls until they engage with the neighbouring thread groove. Corresponding finger for the deflection of the balls when the screw is moved in the opposite direction is situated on the other side of the aperture. A disadvantage of these systems consists in that the balls strike relatively harshly against the said fingers. In the case of long nuts, a plurality of such apertures, distributed in the longitudinal direction, must also be provided for the return of the balls.

When the screw is turned out of the nut, the balls drop out, which is also a disadvantage.

When rollers are used as rotating bodies, it is also known to provide the rollers with a thread lead angle which corresponds to the lead angle of the nut thread. The rollers then roll on the nut thread without being displaced axially in relation to the nut. In order to make this possible, it is however necessary for no sliding to take place between the rollers and the nut. In order to fulfill this condition in the case of known roller screws of this type, additional toothed rims are provided at both ends of the nut and corresponding toothings are provided at the ends of the rollers, which ensure that the rollers will be compelled to roll on the nut thread. This in turn requires that the ratio of the thread diameters of the nut and the rollers at their points of contact should be exactly equal to the ratio of the number of teeth of the toothed rim and of the rollers. Similarly, identical thread lead angles can be provided for the roller and the screw and sliding between those parts prevented.

It is also known to provide special profiles for the threads of the nut and of the rollers in such a manner that these profiles ensure rolling without sliding and at the same time avoid the necessity of great precision with regard to the diameter of the thread of the screw. In this case, however, the disadvantage is the high cost of manufacture of the rollers with their special thread profiles.

The aim of the present invention is to provide a roller screw which works either with balls or with simple grooved rollers as rotating bodies and which in a simple manner makes it possible for the rotating bodies to be returned periodically over an axial distance within the annular space between the screw and the nut, when in consequence of the rotation of the screw in the nut their axial advance has reached a determined value.

According to the invention this is achieved by providing in the annular space between the screw and the nut a cylindrical cage having openings cut in its cylinder wall, the rotating bodies being guided in said openings, while in the thread of the nut there is provided at least one groove cut therein in the longitudinal direction and of such dimensions that the rotating bodies come out of engagement with the thread of the screw when passing said groove, while at both ends of the groove cams are disposed which during the passing of the groove push the rotating bodies at least a distance corresponding to the distance between two neighbouring thread grooves in the screw.

The cage also makes assembly and dismantling simple, since the rotating bodies are held by it on the screw and cannot fall out, either before or after the screw is screwed out of the nut.

Figure 2:
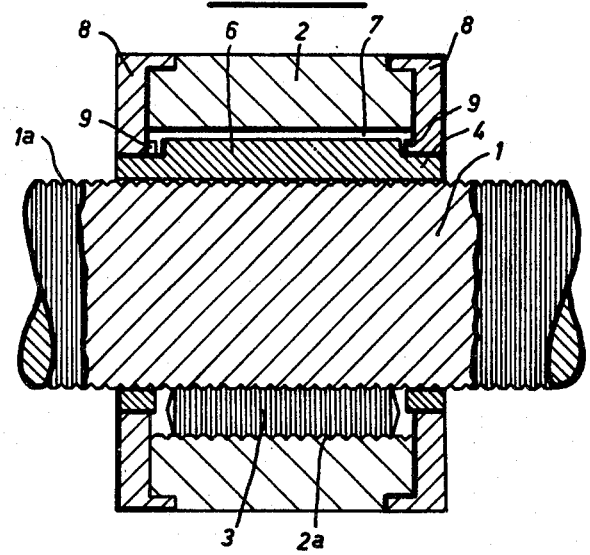

Various examples of construction of a roller screw according to the invention are described more fully below with reference to the accompanying drawings, in which:

FIGURE 1 shows a radial cross-section through a first embodiment,

FIGURE 2, an axial section of the same embodiment on the line II—II in FIGURE 1, FIGURE 3, one of the rollers in the embodiment illustrated in FIGURES 1 and 2, on a larger scale, FIGURE 4, part of the embodiment illustrated in FIGURES 1 and 2, in developed form, with a roller in contact with the cams, FIGURE 5, a diagrammatical cross-section corresponding to FIGURE 4, with the various positions of the roller when passing the groove, FIGURE 6, a development of the cage with rollers corresponding to a second embodiment with inclined openings, FIGURE 7, a third embodiment with balls, FIGURE 7a, a variation of FIGURE 7 with an additional ball spacer, FIGURE 8, a fourth embodiment with different screwthreads for screw and nut, FIGURE 8a, a development corresponding to FIGURE 8, and, FIGURE 9, a fifth embodiment with divided rollers.

The first example of construction of a roller screw which is illustrated in FIGURES 1 and 2 consists of a screw 1 with the thread 1a, a nut 2 with the thread 2a, the grooved rollers 3 disposed in the annular space between the screw and the nut, and a cage 4 which is provided with apertures 5 and which serves to guide the rollers 3 and in addition prevents the rollers or balls (FIGURES 7 and 7a) from dropping out of the nut when the screw is screwed out. The bars 6 of the cage 4 ensure that the rollers are a uniform distance from one another.

The profiles of the screwthreads 1a and 2a of the screw and nut and also of the grooves of the rollers 3 are so adjusted to one another that the grooved rollers 3 can engage both in the screwthread of the screw and in the screwthread of the nut. FIGURE 3 shows a roller 3 on a larger scale; the profiles 3a of the grooves may preferably be spherical. A groove 7 is cut into the screwthread 2a of the nut in the longitudinal direction, the depth and breadth of said groove being so dimensioned that a roller 3 which is situated in it is out of engagement with the screwthread 1a of the screw. On both end faces of the nut 2 a disc 8 is provided, through which the screw 1 projects towards the outside and which has opposite the respective groove end a cam 9 which has a surface 10 inclined in the axial direction (FIGURE 4).

If the screw 1 is turned in the nut 2, the rollers 3 roll both in the screwthread of the screw and in the screwthread of the nut and at the same time advance axially, the axial movement for one full rotation of the roller in relation to the screwthread of the nut corresponding exactly to the lead of the screwthread 2a of the nut. This axial advance of the rollers per revolution on the screwthread of the nut is independent of the pitch of the screwthread and the number of screwthread turns of the screw 1 and also of the diameters of the screw, the rollers, and the nut; these magnitudes merely determine the advance of the rollers per rotation of the screw or the speed of rotation of the rollers in relation to the speed of rotation of the screw. Whenever in its rotation about the screw axis a roller 3 arrives in the groove 7, the inclined surface 10 of the cam 9 pushes it back axially a distance corresponding to the lead of the screwthread of the nut. On further rotation of the screw, the roller in question then comes into engagement again with the screwthreads of the screw and the nut. If the screw is rotated in one direction, the axial return movement is effected by the cam 9 of one disc 8, and on rotation in the other direction by the cam 9 of the other disc 8.

In FIGURES 4 and 5 the process of the axial return movement of a roller 3 through one of the cams 9 during the passing of the groove is illustrated diagrammatically. As shown in FIGURES 4 and 5, a roller 3 moves in the direction of the arrow S during the rotation of the screw and reaches the groove 7. In this position, which is designated by 3', the roller is out of engagement with the thread 1a of the screw and during the further movement is displaced axially by the cage by means of the surface 10 of the lower cams 9 in FIGURE 4 by the distance $P_2$. $P_2$ is the lead of the screwthread of the nut. After the roller has reached this position (3" in FIGURE 5), in its further movement it comes into engagement again with the threads 2a and 1a respectively of the nut and screw (position 3'''). As soon as the lead angle of the screwthread of the nut, which will be designated by $\alpha_2$, is relatively small, the rollers 3 can be directed practically parallel to the axis of the screw and accordingly the apertures 5 in the case 4 are axially parallel slots. $\alpha_2$ is always smaller than the lead angle $\alpha_1$ of the thread of the screw, because of course the diameter $D_1$ of the screw is smaller than the inside diameter $D_2$ of the nut and for equal screwthread pitches $P$ of the screw and the nut the following relationship is applicable $$tg\alpha_1 = \frac{P}{\pi D_1} > \frac{P}{\pi D_2} \alpha = tg\alpha_2$$

Since however the main friction occurs between the rollers and the screwthread of the nut, the pitch of the latter is decisive where friction is concerned.

If $\alpha_2$ is relatively great, then in order to keep the friction between the grooves of the rollers and the screwthread of the nut small, according to another principle of the invention the rollers are inclined in relation to the axis of the screw in such a manner that the flanks of the roller grooves and the flanks of the thread of the nut lie parallel to one another, that is to say the axis of the roller is inclined in relation to the axis of the screw by exactly the lead angle $\alpha_2$ of the thread of the nut. This position of the rollers is achieved by a corresponding inclination of the apertures 5 in the cage 4 and is illustrated in FIGURE 6, which shows a cage 4 with the rollers 11 in a developed illustration. The groove 7 also has a corresponding inclination.

FIGURE 6 also shows the distribution of the rollers over the periphery of the screw. Each roller is offset axially in relation to the neighbouring roller by an amount which is equal to the ratio $P_2/N$, where $P_2$ is the lead of the nut and $N$ the number of rollers, it being assumed that the rollers are distributed at equal angular distances over the periphery of the nut and of the screw respectively. In FIGURE 6 the cams 9 according to the embodiment illustrated in FIGURE 4 are also indicated.

According to another alternative of the invention, the rollers 11 in each aperture 5 are subdivided into two rollers 11a and 11b. This subdivision will be described more fully below with reference to FIGURE 9.

According to another modification of the invention, balls 12 are used instead of the grooved rollers (FIGURE 7). The apertures 5 of the cage 4 in which these balls are guided may, as in the case of the rollers, either be axially parallel slots or, as shown in FIGURE 7, be inclined in relation to the axis of the screw. The greater the inclination of the cage apertures in relation to the axis of the screw, the greater the number of balls which can be used per unit of length of the screw. The axial return of the balls in one of the apertures of the cage is effected in the same manner by means of the cams 9 of the discs 8 as already described with reference to the rollers.

In the case of very wide screwthread grooves, in the embodiment illustrated in FIGURE 7 correspondingly large balls 12 would have to be used, which would be inconvenient. In this case, as illustrated in FIGURE 7a, an additional cage 5a is inserted in the cage aperture 5, this additional cage being freely slidable along said aperture and serving as spacing means for the balls 12. In this way balls of any desired small dimensions may be used even with large screwthreads. The distance between centres of two neighbouring balls then nevertheless once again corresponds to the lead of the screwthread or in the case of multiple screwthreads to the distance between two adjoining thread grooves.

In order to discuss the possible combinations in respect of leads and number of threads of screw and nut in the roller screws according to the invention, and also in respect of the possible number of longitudinal grooves, the following terms will be used for the sake of simplicity:

$P_2$ and $P_2$=lead of the threads of the screw and nut respectively.

$d_1$ and $d_2$=distance between two thread grooves in the screw and nut respectively (FIGURE 8).

$n_1$ and $n_2$=number of threads of screw and nut respectively $k$=number of longitudinal grooves distributed uniformly over the periphery of the thread of the nut.

It will be assumed below that $P_1=P_2$. This general case is of particular technical importance, because then a defined and exactly calculable advance of the screw per screw rotation exists and the number of the rollers or rows of balls distributed over the periphery of the screw can be freely selected.

For reasons of equilibrium and stability, this number of rollers or rows of balls may not however be smaller than three when working with two return grooves disposed one behind the other in the axial direction and offset by an angle different from 0°, 120° or 240° in relation to the peripheral position (or with two corresponding nuts with return grooves not in alignment). Otherwise, with three rollers or row of balls the screw would have no defined radial position during the return movement of a roller or row of balls.

If as in the embodiments described above one return groove is used, the minimum number of rollers or rows of balls is five for reasons of stability.

It is now by no means necessary for the number of threads $n_1$ and $n_2$ to be identical but on the contrary $n_1$ can in general be selected to be equal to $m \times n_2$, $m$ being any integral number.

In addition it is not necessary for $P_2$ to coincide with the distance $d_2$ of the width of the nut thread flanks or a multiple of $d_2$. Since in fact the nut thread is interrupted by at least one longitudinal groove for the return of the rotating bodies and therefore there is no continuous thread, the two thread ends cut off at the longitudinal groove need not coincide—if there were continued through the groove with the lead angle of the thread. On the contrary, independently of the magnitude $d_2$, they may be offset in relation to one another at the ends of the longitudinal groove exactly by the lead $P_2$ or else by a fraction of that lead.

The possibilities arising therefrom will be discussed with reference to FIGURE 8. In this embodiment the thread $2a$ of the nut $2$ has a thread groove spacing $d_2=2d_1$. In order that the rollers $3$ may engage in both screwthreads, the profiles of the thread $2a$ of the nut and thread $1a$ of the screw must naturally be correspondingly similar.

It will be assumed that in general $n_1=m \times n_2$ (in the example illustrated in FIGURE 8 $m=2$). The common leads of both threads is $p=n_1.d_1$ and is independent of $d_2$ in the sense that $d_2$ must merely be an integral multiple of $d_1$.

On one full rotation of the rollers $3$ (or of the balls) in the nut thread, they undergo an axial advance $P_2$. If only one longitudinal groove ($k=1$) is provided in the nut thread, provision must be made for the axial displacement $A=P_2$ when the groove is passed. After a rotation in the nut thread of only 360°/$n_1$ however, the rotating bodies have undergone an axial advance of $A=P_2/n_1=d_1$ already. Because of the above-mentioned independence between $P_2$ and $d_2$ therefore, $k=n_1$ grooves with an angular spacing of 360°/$n_1$ can be provided in the nut thread, so that the rotating bodies reach a groove in each case after travelling a distance of 360°/$n_1$, and in said groove undergo an axial return movement of only $A=d_1$. The two ends of the screwthread of the nut which are cut off and each of which leads into a groove are then offset in relation to one another in each case by the distance $A=d_1$, as will be explained below with reference to FIGURE 8a.

Through the means described the effect is achieved that with relatively great screwthread leads $P_2$, such as occur with multiple screwthreads, the axial displacement $A$ required in each case for the rotating bodies on passing a groove need not correspond to this large amount $P_2$, but only to a distance which is equal to the distance $d_1$ between neighbouring screwthread grooves in the screw.

For this purpose it is merely necessary to select the number of rollers (or rows of balls) so that not all the rollers are situated simultaneously in any one groove.

The example illustrated in FIGURE 8 can also be so interpreted that $n_1=n_2=1$. This case is illustrated in FIGURE 8a, which shows a nut $2$, with the screwthread $2a$, cut open and developed in the plane of the drawing. In this case the common lead of the threads $P=d_1=d_2/2$ and a groove $7$ is provided into which the two cut-off nut thread ends enter offset from one another by an amount $d_2/2$.

The more general case $n_1=n_2=n$, where $n$ is any whole number, corresponds to the special case $m=1$ of the cases exlained above.

The possible combinations described can be further extended if $n_1$ is made equal to $n'_1.n'_1$, that is to any equal to the product of two whole numbers $n_1'$ and $n_1''$.

To sum up, the possible combinations can then be described as follows:

With given numbers of threads $n_1=m.n_2$ ($m$ being any desired whole number) and with a given lead $P=n_1.d_1$, the number of the longitudinal grooves in the nut thread can be selected independently of $d_2$ as $k=n_1'$, while the respective axial displacement of the rotating bodies on passing a longitudinal groove $A=n_1'.d_1=P/n_1$.

It is naturally also possible for the number $n_2$ of threads of the nut to be a multiple of the number $n_1$ of the threads of the screw. The smallest possible axial displacement of the rotating bodies on passing a groove is always given by the distance $d_1$ of two neighbouring thread grooves in the screw, which in this case corresponds to a plurality of nut grooves.

It can be pointed out that in the roller screws according to the invention the pitches $P_1$ and $P_2$ of the screw and nut threads may also be different. So-called differential screw will then be produced.

With these differential screws the number of rollers which can be inserted between screw and nut cannot however be any number but is limited by the condition that a longitudinal plane through the axis of the screw and the axis of a roller intersects the screwthread profiles of the nut and of the screw and also the groove profiles of the respective roller in such a manner that these profiles coincide.

In all cases described the axial return of the rotating bodies on passing a longitudinal groove takes place in the same manner with the aid of cams disposed at the ends of the groove as was described with reference to the first embodiment illustrated in FIGURES 4 and 5.

If, as already mentioned, the apertures in the cage and hence the axes of the rollers are disposed inclined in relation to the axis of the screw, the points of contact between the periphery of the roller and the screwthread of the screw or nut no longer lie on a straight line, but—if the rollers were flexible and were adapted to the curvature of the screw—on a helical line along the periphery of the screw or of the inside of the nut. Since however the rollers are practically rigid, in this case in theory only, one point of contact with the screw and two points of contact with the nut occur.

In order to avoid this unfavourable distribution of force and hence the stressing of the parts, according to another principle of the invention the rollers in one aperture of the cage are subdivided into smaller partial rollers, the axes of which are swingable in rotation to one another about a small angle, so that they can adapt themselves to the curvature of the aforesaid ideal helical line of contact.

In FIGURE 9, a roller 11 of this type, consisting of partial rollers 11a, 11b, 11c and 11d, is illustrated. While the two end rollers 11a and 11b are each provided with a conical end face as terminations and are slightly longer than the middle partial rollers 11c and 11d, the middle partial rollers are cylindrical in shape and have on one end face a pin 12 and on the other end face a recess 13 corresponding to the pin. One of the end faces of the end roller 11a is also provided with a pin 12 and one of the end faces of the end roller 11b with a recess 13. In this way it is possible for any desired number of intermediate partial rollers to be joined together between two end rollers in an opening in the cage by engaging the pins 12 in the recesses 13 in the respective neighbouring rollers, while a slight swinging of the axes of the individual partial rollers in relation to one another is possible.

Through these pin connections on the end faces, the different rearward moments acting on the individual partial rollers in consequence of the tangential forces on the rollers are balanced.

In the embodiment illustrated in FIGURE 6 for example only two end rollers 11a and 11b are joined together. The number of partial rollers used naturally depends on the length of the cage openings, and the length of the partial rollers themselves will be made the shorter, the greater the inclination of the openings in the cage or of the roller axes in relation to the screw axis. In addition, in cases where it is important that the screw should be guided in the nut entirely without play, use can be made of the intrinsically known division of the nut into two. The nut is then divided along a radial cross-section and the two halves are pressed together axially in such a manner that at the point of contact a gap is formed between the neighbouring thread grooves of the respective halves, this gap being smaller by the amount of the clearance to be eliminated than the "genuine" distance between thread grooves. The rollers then lie in one half nut fast against one side of the screwthread flanks and in the other nut half fast against the other side of the screwthread flanks. Another possible way of eliminating play comprises making an axially parallel cut along the periphery of the nut and lightly compressing it, so as to reduce its inside diameter, by means of suitable gap nuts or other clamping means.

So far, mention has been made only of cases in which the screw turns in the stationary nut. The invention naturally also covers roller screws in which the screw is held fast and the nut is rotated. For this purpose there is no change in the mechanism of the above-described axial return movement of the rotating bodies in relation to the nut thread and in the above-mentioned possible combinations.

What I claim is:

1. Roller screw, comprising a screw and a nut, the diameter of the screwthread of the latter being greater than the diameter of the screwthread of the screw, so that between screw and nut an annular space is formed, and also of rotating bodies which are disposed in said annular space and which engage both in the screwthread of the screw and in the screwthread of the nut, characterised by a cylindrical cage which is disposed in the aforesaid annular space and which has cut in its cylinder wall openings in which the rotating bodies are guided, by at least one groove cut in the screwthread of the nut in the longitudinal direction and of such dimensions that the rotating bodies are out of engagement with the screwthread of the screw during the passing of the groove, and also by cams which are disposed at both ends of the groove and which during the passing of the groove displace the rotating bodies in the axial direction by at least a distance corresponding to the distance between two neighbouring screwthread grooves in the screw.

2. Roller screw according to claim 1, characterised in that the rotating bodies are balls.

3. Roller screw according to claim 2, characterised in that a spacer, freely slidable in the longitudinal direction in the openings in the cage, for the balls of each row of balls is inserted into said openings.

4. Roller screw according to claim 1, characterised in that the rotating bodies are grooved rollers.

5. Roller screw according to claim 4, characterised in that the grooves have a spherical profile.

6. Roller screw according to claim 1, characterised in that the openings in the cage are axially parallel straight slots.

7. Roller screw according to claim 1, characterised in that the longitudinal direction of the openings in the cage is inclined in relation to the axis of the screw, so that the openings have a helical shape.

8. Roller screw according to claim 7, characterised in that the inclination of the longitudinal direction of the openings in relation to the axis of the screw is equal to the lead angle of the screwthread of the nut.

9. Roller screw according to claim 7, characterised in that in each opening in the cage there are disposed a plurality of smaller partial rollers lying one against the other in the longitudinal direction, while the axes of the partial rollers are swingable in relation to one another.

10. Roller screw according to claim 9, characterised in that the two outer partial rollers at the respective ends of the openings of the cage are longer than the partial rollers lying therebetween.

11. Roller screw according to claim 9, characterised in that the individual partial rollers have on one end face a pin and on the other end face a cylindrical recess which corresponds to the size of the pin, and that when the partial rollers are disposed inside an opening the pin in one roller projects in each case into the recess in the neighbouring roller.

12. Roller screw according to claim 1, characterised in that the number of threads of the screw is a multiple of the number of threads of the nut.

13. Roller screw according to claim 1, characterised in that the leads of the screw and nut screwthreads are equal.

14. Roller screw according to claim 13, characterised in that the number of the longitudinal grooves uniformly distributed over the periphery of the screwthread in the nut is equal to the number of threads of the screw.

15. Roller screw according to claim 14, characterised in that the cut-off screwthread ends of the nut which lead into a longitudinal groove are offset in relation to one another by the distance between two neighbouring screwthread grooves in the screw.

16. Roller screw according to claim 13, characterised in that the number of the threads of the screw is the product of two whole numbers $n_1'$ and $n_1''$, and that the number of the longitudinal grooves distributed uniformly over the periphery of the screwthread of the nut is equal to $n_1'$, while the axial displacement of the rotating bodies on passing a groove is equal to the lead of the screwthread divided by $n_1'$.

17. Roller screw according to claim 16, characterised in that the cut-off screwthread ends of the nut which lead into a longitudinal groove are offset in relation to one another by $n_1''$-times the distance between two neighbouring thread grooves in the screw.

18. Roller screw according to claim 1, characterised in that the number of screwthreads of the nut is a multiple of the number of screwthreads of the screws.

19. Roller screw according to claim 1, characterised in that the leads of the screw and nut screwthreads are different.

20. Roller screw according to claim 1, characterised in that the cage at the same time prevents the rotating bodies from falling out when the screw is turned out of the nut.

21. Roller screw according to claim 1, characterised in that in order to avoid play two half nuts are pressed axially against one another.

22. Roller screw according to claim 1, characterised in that in order to avoid play the nut has an axially parallel cut along its periphery and is compressed slightly by clamp means, preferably a suitable cap nut.

References Cited by the Examiner

UNITED STATES PATENTS

| | | | |
|---|---|---|---|
| 522,249 | 7/94 | Buckley. | |
| 2,069,471 | 2/37 | Baker | 74—459 |
| 2,131,151 | 9/38 | Smith. | |
| 3,004,445 | 10/61 | Mondon | 74—424.8 |

DON A. WAITE, *Primary Examiner.*